Patented Sept. 14, 1954

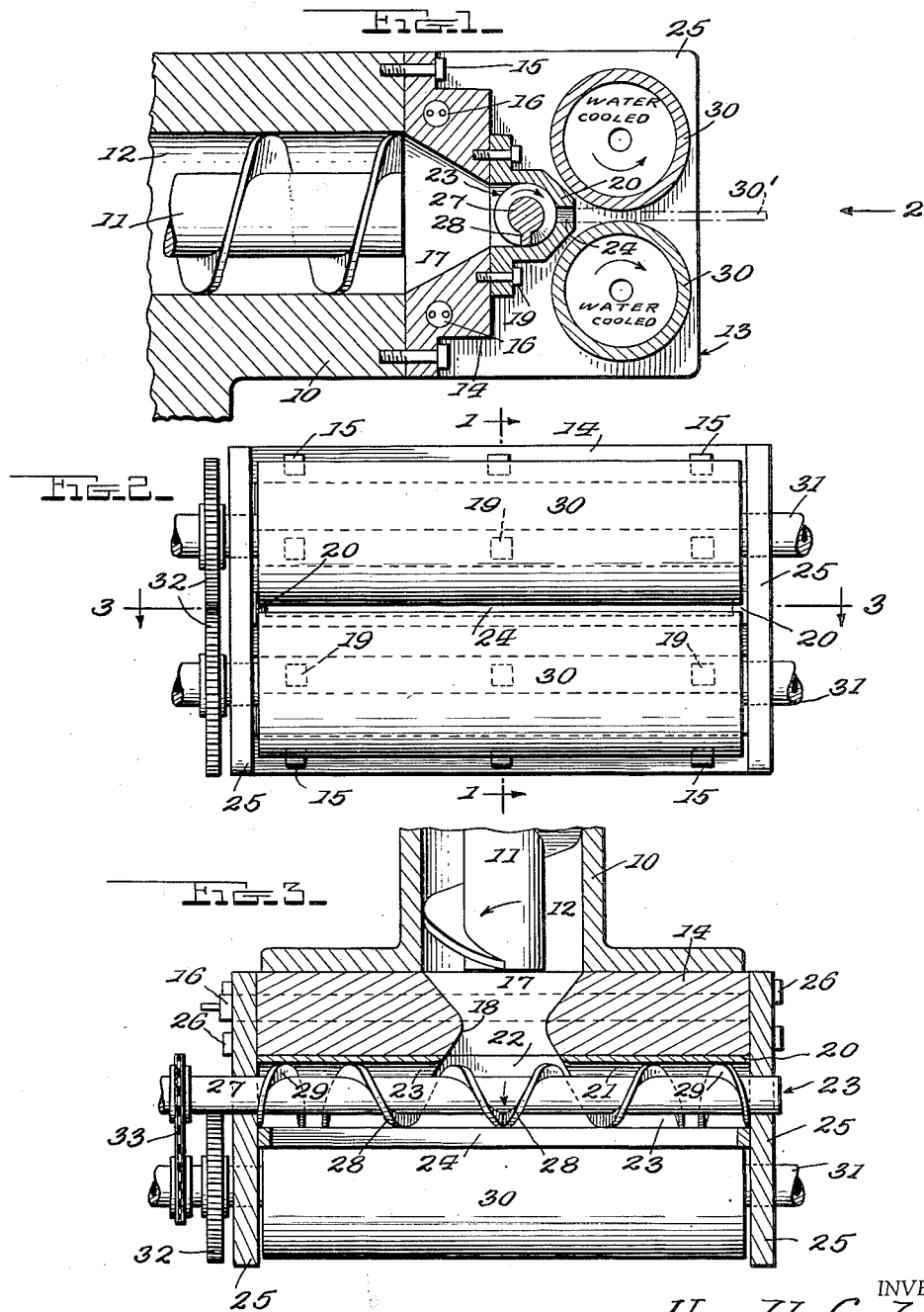

2,688,769

UNITED STATES PATENT OFFICE 2,688,769

EXTRUSION APPARATUS

Harold Corbett, East Orange, N. J., assignor to Halco Plastics, Inc., a corporation of New Jersey Application March 14, 1951, Serial No. 215,545

2 Claims. (Cl. 18—12)

This invention relates to a molding structure and method for use either as an attachment or built-in part of an extruder particularly for thermoplastic materials of any standard or other type, and which provides means acting as a pump to boost the pressure on the material.

It is especially aimed to provide a novel construction and method which will insure travel of the plastic material throughout the line of advance without any portion thereof becoming pocketed, static or stagnant, in order to avoid overworking or burning of the material.

A prime aim is to provide means wherein the objects mentioned are attained especially at the lateral extremities of the distributing barrel.

Further in attaining the ends mentioned, an object is to provide a distributing screw conveyor means which acts as a pump to boost the pressure on the material and the axis of which conveyor crosses the line of advance of the thermoplastic material, which conveyor has main flights whose pitches are in opposite directions to spread the thermoplastic material laterally or away from such line, which conveyor also has terminal flights of opposite pitch to the respective adjacent main flights to return the thermoplastic material from the ends of the distributing chamber toward said line, thence through a slot or slots and through the pass of finishing rolls to emerge in sheet or other form.

Various additional objects and advantages will become apparent from a consideration of the description following taken in connection with the accompanying drawings illustrating an operative embodiment, and wherein:

Fig. 1 is a longitudinal sectional view through the improvements in connection with a fragment of a conventional extruder, such section being taken approximately on the plane of line 1—1 of Fig. 2;

Fig. 2 is an end elevation of my improvements looking from the right of Fig. 1 in accordance with line 2 and the arrow in the latter figure; and Fig. 3 is a horizontal sectional view taken on the plane of line 3—3 of Fig. 2.

Referring specifically to the drawings, wherein like reference characters designate like or similar parts throughout the different views, an extruder is fragmentarily shown of which 10 is the discharge end of the barrel and 11 is the conveying screw suitably rotatably operated in the bore or chamber 12 of such barrel. This representation of an extruder is to be taken as conventional inasmuch as my improvements are applicable to any standard or other extruder, for instance that disclosed in my co-pending application for Method and Machine for Combined Extruding and Injection Molding, Serial No. 156,207, filed April 15, 1950. It is clear that the usually heated thermoplastic material is supplied in fluid condition through the chamber 12 by the screw 11 alone or augmented by pressure as preferred, and discharged through the right hand end of the barrel 10 with reference to Fig. 1.

In carrying out my invention, I provide a head or unit generally designated 13. This unit consists of a base or attaching plate 14, and it may be permanently or detachably secured to the barrel 10 or even form an integral part thereof. As shown, plate 14 is detachably secured to said barrel 10 as by means of bolts 15. All other parts of my improvements are connected to or mounted from said plate 14 preferably detachably to facilitate inspection, assembly and repair. Like the barrel 10, in order to properly maintain the condition and plasticize the material, such plate is suitably heated. This may be effected in any suitable manner with steam, hot water, oil or the like, but as shown, conveniently the plate has fitted therein any number of conventional electric heating units 16. In registry or alignment with the bore 12, said plate 14 has a discharge opening or throat 17 to receive the plastic material, and it will be noted that such opening is preferably constricted toward the forward end and at such end the constriction widens or flares horizontally as shown in Fig. 3 at 18.

Secured as by means of bolts 19 against the forward face of the plate 14 is a horizontal elongated distributing barrel 20 which is hollow from end to end to provide a distributing chamber 21. The rear wall of barrel 20 has a slot 22 registering with the opening 17 at the flare 18 in order to receive the plastic material. A horizontal screw-member 23 rotates clockwise within the distributing chamber 21 to discharge the material through a relatively narrow elongated slot or nozzle opening in the front wall of the distributing barrel at preferably the same level as the axis of the distributing screw 23. While a single slot 24 has been shown, it is to be understood that this single slot may be replaced by any plurality of slots or openings desired, and also that the shape and proportions may be varied at will.

It is to be emphasized that the screw 23 and associated parts act as a pump and boost the pressure on the material.

At each side of the head 13 is a plate 25 detachably fastened thereto as by means of bolts 26. Said plates 25 extend forwardly beyond the plate 14, particularly covering and closing the ends of the distributing chamber 21.

Reverting to the distributing screw 23, it comprises a shaft 27 which is journalled in both side plates 25. On said shaft 27 are two main flights or threads 28 which may be connected to each other approximately in line with the longitudinal axis of the feed screw 11, and which two flights are of opposite pitch and extend in opposite directions in order that the material received in the distributing chamber 21 will be spread or distributed laterally from the center of that chamber toward the opposite ends thereof. Adjacent the opposite ends of the distributing chamber 21, shaft 27 is provided with auxiliary threads or flights 29, which it will be noted are in scraping contact with the end walls for said distributing chamber 21 afforded by said end plates 25. These flights 29 are of opposite pitch or extend in opposite directions and in directions respectively reversed to the adjacent main flights 28 so that material in the distributing chamber adjacent the ends of the latter will not become pocketed, static or stagnant, but will be returned toward the junction of the flights 28 and by them fed through the opening 24.

In front of said opening 24, the discharged body or sheet of plastic material as suggested in dotted lines at 30 in Fig. 1, is contacted and fed forward by upper and lower horizontal rolls 30 carried by shafts 31 suitably journalled in the side plates 25. The action of the rolls 30 and the pass or space between them maintains the correct finish and thickness of the material, such material after passage between the rolls 30 being in form, shape and condition for commercial or other use.

Rolls 30 are driven in any suitable manner in opposite directions as suggested by the arrows in Fig. 1. For instance one of the shafts 31 is driven from the drive mechanism for the screw 11, or from a separate source of power. Such shafts 31 have intermeshing gears 32. From the lower shaft 31, a conventional chain and sprocket drive 33 may be provided for the distributing screw 23, although screw 27 may have a separate or any other drive to vary the output and pressure.

In connection with the maintenance of the proper working temperatures and conditions for the plastic material, rolls 30 are preferably hollow for the circulation of water or oil therethrough in any conventional manner to cool the same.

In operation the heated and conditioned plastic material will be supplied from a chamber 12 by screw 11 through the opening or throat 17 and slot 22 into the distributing chamber 21 of barrel 20. In such chamber the plastic material will be spread in opposite directions from the line of feed by the main flights 28 and passed through the slot 24 or the equivalent. Such material upon approaching the ends or lateral extremities of the chamber 21 will be engaged by the flights 29 and returned thereby due to their opposite pitch or direction and their respective opposite pitch or direction relative to the adjacent flights 28 during the line of feed and moved or distributed forward thereby through the opening 24. Any of the material which may engage the walls of the distributing chamber 21 will be scraped therefrom by the flights 29 after emerging through the slot 24, the material will enter the pass between rolls 30, contacted by the latter, and to maintain the correct finish and thickness of the sheet or equivalent suggested at 30. It will thus be seen that the screw 23 acts as a pump and boosts the pressure of the material so that structure insures travel of the plastic material throughout the line of feed without any portion thereof becoming pocketed, static or stagnant, and especially at the ends of the distributing chamber 21, which result cannot be attained under existing conditions, due to fluctuation in temperature, slow-down in operation, and the like.

Various changes may be resorted to provided they fall within the spirit and scope of the invention.

I claim as my invention:

1. Apparatus of the class described comprising a member having a funnel shaped passage therethrough, walls forming an elongated cylindrical chamber communicating at its center with the small end of said passage and having its long axis perpendicular to the axis of the passage, said chamber having an elongated narrow discharge slot disposed in the wall opposite said passage, a rod journalled for rotation in said chamber, a first pair of screw flights of opposed pitch disposed on said rod and meeting at the center of said chamber for forcing plastic material from the center toward the ends of said chamber and through said discharge slot, and a short screw flight disposed at each end of said rod pitched to force plastic material inwardly of said chamber.

2. The apparatus defined in claim 1 wherein a pair of spaced hollow feed rolls disposed on parallel axes is mounted adjacent said slot in position to receive between them plastic material leaving said slot, and means for rotating said rod and said rolls.

References Cited in the file of this patent

UNITED STATES PATENTS

| Number | Name | Date |
|---|---|---|
| 790,918 | Du Pont | May 30, 1905 |
| 1,302,484 | Stratton et al. | Apr. 29, 1919 |
| 1,327,721 | Mattison, Jr. | Jan. 13, 1920 |
| 2,458,068 | Fuller | Jan. 4, 1949 |
| 2,535,865 | Poncelet | Dec. 26, 1950 |
| 2,543,307 | Swallow et al. | Feb. 27, 1951 |